(12) United States Patent
Hornbeck et al.

(10) Patent No.: US 6,775,453 B1
(45) Date of Patent: Aug. 10, 2004

(54) ON-CHIP GRADED INDEX OF REFRACTION OPTICAL WAVEGUIDE AND DAMASCENE METHOD OF FABRICATING THE SAME

(75) Inventors: Verne C. Hornbeck, Colorado Springs, CO (US); Derryl D. J. Allman, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/217,183

(22) Filed: Dec. 21, 1998

(51) Int. Cl.$^7$ ................................................ G02B 6/10
(52) U.S. Cl. ...................................... 385/129; 385/130
(58) Field of Search ............................... 385/129, 130, 385/131, 132

(56) References Cited

U.S. PATENT DOCUMENTS

| | | | |
|---|---|---|---|
| 4,939,682 A | | 7/1990 | Falk |
| 5,055,426 A | | 10/1991 | Manning |
| 5,123,078 A | * | 6/1992 | Thomas ...................... 385/130 |
| 5,198,008 A | | 3/1993 | Thomas |
| 5,206,925 A | * | 4/1993 | Nakazawa et al. .......... 385/142 |
| 5,219,787 A | | 6/1993 | Carey et al. |
| 5,235,663 A | * | 8/1993 | Thomas ...................... 385/130 |
| 5,281,305 A | * | 1/1994 | Lee et al. ...................... 216/24 |
| 5,291,574 A | | 3/1994 | Levenson et al. |
| 5,387,269 A | * | 2/1995 | Nijander et al. ............... 216/24 |
| 5,434,935 A | | 7/1995 | Kragl |
| 5,465,860 A | | 11/1995 | Fujimoto et al. |
| 5,540,346 A | | 7/1996 | Fujimoto et al. |
| 5,562,838 A | * | 10/1996 | Wojnarowski et al. ........ 216/24 |
| 5,598,501 A | * | 1/1997 | Maruo et al. ................ 385/143 |
| 5,600,741 A | | 2/1997 | Hauer et al. |
| 5,604,835 A | * | 2/1997 | Nakamura et al. .......... 385/129 |
| 5,614,765 A | | 3/1997 | Avanzino et al. |
| 5,708,303 A | | 1/1998 | Jeng et al. |
| 5,949,942 A | * | 9/1999 | O'Connor .................... 385/129 |
| 5,949,945 A | * | 9/1999 | Okano et al. ................ 385/132 |
| 6,044,192 A | * | 3/2000 | Grant et al. ................. 385/129 |
| 6,097,864 A | | 8/2000 | Kropp |

OTHER PUBLICATIONS

Technical Note—007B, Duke Scientific Corporation, Dec. 1, 1996.*
Fiber Optic Sensors, Edited by Ric Udd, 1991 by John Wiley & SIns, Inc. , pp. 19–22.*
Fiber Optic Reference Guide by David Goff, 1999 by Force, Incorporated, pp. 21–22.*

* cited by examiner

Primary Examiner—Samuel A. Turner
Assistant Examiner—Layla Lauchman
(74) Attorney, Agent, or Firm—John R. Ley, LLC (57) ABSTRACT

A graded index of refraction optical waveguide is formed in interlayer dielectric material located above a substrate an integrated circuit-like structure. The waveguide includes a refractive layer of optically transmissive material surrounding a core of optically transmissive material within a trench in the dielectric material. The material of the core has a higher index of refraction than the refractive layer and the material of the refractive layer has a higher index of refraction than the dielectric material. More than one refractive layer may also be formed in the trench, with the inner refractive layer having an index of refraction higher than the outer refractive layer and less than the core.

6 Claims, 4 Drawing Sheets

ON-CHIP GRADED INDEX OF REFRACTION OPTICAL WAVEGUIDE AND DAMASCENE METHOD OF FABRICATING THE SAME

CROSS-REFERENCE TO RELATED INVENTIONS

This invention is related to other inventions by the present inventors for a "On-Chip Single Layer Horizontal Deflecting Optical Waveguide and Damascene Method of Fabricating the Same" and "On-Chip Multiple Layer Transitioning Optical Waveguide and Damascene Method of Fabricating the Same," described in a concurrently filed U.S. patent applications Ser. Nos. 09/217,182 and 09/217,184, respectively. These applications are assigned to the assignee hereof. The subject matter of these applications is incorporated herein by this reference.

This invention relates to optical waveguides formed in integrated circuit (IC)-like structures and positioned in interconnect layers of the IC-like structure. More particularly, this invention relates to a new and improved optical waveguide formed with a graded index of refraction in an IC-like structure. In addition, the present invention relates to a new and improved method of fabricating a graded index of refraction waveguide in an IC-like structure using damascene fabrication process steps that are typically employed in the fabrication of electrical integrated circuits.

BACKGROUND OF THE INVENTION

The ongoing evolution of microcircuit design has focused on the speed and size of electrical integrated circuit (IC) components, typically in a silicon chip. IC designers continuously strived to make the IC faster while taking up less chip space. Currently, interconnection technology is considered as one of several areas that may be advanced to both increase the speed of the IC and to decrease the size of the chip. For instance, since most of the conductors that interconnect various functional components on the chip are made of metal and carry electrical signals, advances are being made in various metal compositions that can carry similar signals at a faster speed but which are smaller and thus consume less space.

Optical signals carried by waveguides are sometimes considered as replacements to the more common electrical signals carried by metal conductors. Optical signals allow the IC to operate more quickly or at a higher speed, and unlike electrical signals, optical signals are usually not susceptible to noise and interference. In general, optical conduction and reduced susceptibility to noise and interference obtain increased speed in data transmission and processing.

Furthermore, due to the coherent nature of laser optical signals and their reduced susceptibility to noise, many more optical signals can be routed in one waveguide or layer of waveguides than is possible using conventional electrical signal interconnect conductors. Therefore, an IC-like structure incorporating optical interconnect waveguides may have fewer waveguides and consume less space.

One typical type of optical interconnection between two IC components comprises a single waveguide or channel between the two components. In general this single waveguide is a straight conductive path between conversion devices which convert electrical signals to optical signals and convert optical signals to electrical signals.

Another type of controllable optical interconnect is called a "railtap." A railtap comprises a first conversion device that converts an electrical signal from a first IC component to an optical signal, an interconnect waveguide that conducts the optical signal from the first conversion device to a second conversion device, where the second conversion device converts the optical signal to an electrical signal and applies it to the second IC component. Upon receiving an electrical signal from the first component, the railtap diverts an optical light signal from a light source waveguide into the interconnect waveguide. An active waveguide polymer is connected to electrodes, and the electrodes create an electric field about the active waveguide polymer, causing a change in the index of refraction of the polymer, usually making it loser to the index of refraction of the source waveguide. When the index of refractions of the railtap and the source waveguide are similar, light is refracted from the source into the railtap polymer. Light is thereby transmitted selectively through the interconnect waveguide toward the second component as a result of applying the electric field to the electrodes on the active waveguide polymer.

The typical waveguide is formed of light transmissive material which is surrounded by an opaque cladding material. Optical signals propagate through the channel, guided by the cladding material. As the optical signals propagate through a particular waveguide, the signals impinge on the cladding material. If the index of refraction of the cladding material is lower than the index of refraction of the material within channel, the majority of the impinging light signal reflects from the cladding material and back towards the center of the channel. Thus the signal propagates through the channel as a result of reflection at the interface of the cladding material.

On the other hand, if the index of refraction of the cladding material is equal to or greater than the channel material, the impinging light signal tends to refract into the cladding material, thus drawing some or all of the optical power of the light signal out of the waveguide. As more light is drawn out of the waveguide, the intensity of the signal received from the waveguide is reduced. An ideal, lossless waveguide propagates an optical signal without losing any signal intensity through refraction.

Typical waveguides used as optical interconnects in IC-like structures comprise a singular channel material having a predetermined index of refraction which is greater than the index of refraction of the cladding material surrounding the channel. Consequently, losses in signal intensity are minimized because the refraction of light energy into the cladding material is minimized due to the lower index of refraction of the cladding material compared to the index of refraction of the channel material. However, the single index of refraction of the channel material eliminates the ability to tailor the waveguide to a lossless or near-lossless condition.

Another drawback associated with fabricating single index of refraction waveguides relates to what is called "dishing." During a typical IC damascene process, material is first deposited in a trench or hole and then polished so that the upper surface of the deposited material is flush with the upper surface of the surrounding material. The different polish rates of the different materials often result in an increased portion of the deposited material being removed from the trench. Consequently, the upper surface of the material filling the trench is not coplanar with the upper surface of the surrounding material, but instead is somewhat concave (viewed top-down), reducing the cross-sectional area of the deposited material. The somewhat concave surface may adversely interfere with signal propagation by causing unwanted reflection and lens effects.

The dishing problem is generally worse for wider trenches than for narrow trenches. Unfortunately, narrowing the trench is not an acceptable solution since optical waveguides require specific cross sectional area dimensions to accommodate an integer number of wavelengths of the optical signal conducted.

It is also known to form graded index of refraction waveguides in IC-like structures. However, the structure of the graded index of refraction waveguide and the process by which it is fabricated in the IC-like structure are unusual, and to a certain degree, are difficult to utilize effectively. For example, the waveguide material must first be formed, and then the support structure for it must be eroded, dissolved or otherwise removed, leaving the waveguide material suspended and fully exposed in free space. A coating material is then vapor deposited in the three dimensions surrounding the waveguide material. Heat is applied, which causes the vapor deposited material to penetrate into the waveguide material from the exterior. The penetration of the vapor deposited material into the exterior of the waveguide material from all sides modifies the index of refraction of the exterior of the waveguide material, thereby creating a graded index of refraction waveguide.

While this prior process is effective in creating a graded index of refraction, the steps of eroding, dissolving or otherwise removing the support structure to expose the waveguide material in free space are unusual and difficult to accomplish. In general these steps are not typically applied in fabricating IC structures. Furthermore, this type of fabrication process cannot be applied in all types of IC-like structures because the supporting material cannot be removed in some IC-like structures, and the deposition and heating of the material cannot be accomplished with some types of IC-like structures. These steps will damage or adversely influence the other components formed on the structure.

It is with respect to these and other considerations that the present invention has evolved.

SUMMARY OF THE INVENTION

An aspect of the present invention is to form an improved optical waveguide having a graded index of refraction within an integrated circuit (IC). Another aspect is to form an optical waveguide with higher transmission efficiencies and less losses. A further aspect is forming a graded index of refraction optical waveguide in an IC-like structure using the typical process steps used to fabricate a typical IC. Yet another aspect is to fabricate a graded index of refraction waveguide while minimizing the effects of dishing.

In accordance with these and other aspects, the present invention relates to a graded index of refraction waveguide in an integrated circuit-like structure having a substrate. The waveguide includes at least one layer of dielectric material positioned above the substrate which defined a trench having side walls. A refractive layer of optically transmissive material is formed within the trench adjoining the side walls. A core of optically transmissive material is also formed in the trench adjoining the refractive layer. The materials of the core, refractive layer and dielectric material are selected so that the index of refraction of the core is greater than the index of refraction of the refractive layer, than the index of refraction of the refractive layer is greater than the index of refraction of the dielectric material.

In accordance with yet other aspects, the invention also relates to a method of fabricating a graded index of refraction optical waveguide in interlayer dielectric material located above a substrate an integrated circuit-like structure. The method includes the steps of forming an elongated trench in the dielectric material, forming a U-shaped refractive layer of optically transmissive material in the trench, forming a core of optically transmissive material within the U-shaped refractive layer, selecting the core material to have a higher index of refraction than the material of the refractive layer, and selecting the material of the refractive layer to have a higher index of refraction than the dielectric material.

In accordance with still further aspects, the invention also relates to a method of fabricating a graded index of refraction optical waveguide in interlayer dielectric material located above the substrate in an integrated circuit-like structure. A refractive layer of optically transmissive material is formed surrounding a core of optically transmissive material within a trench in the dielectric material. The material of the core is selected to have a higher index of refraction than the material of the refractive layer, and the material of the refractive layer is selected to have a higher index of refraction than the dielectric material.

Selecting the index of refraction of the refractive layer to be less than that of the core but greater than that of the dielectric material creates a gradation in the indices of refraction which refracts a greater amount of the light energy into the core, rather than allowing the light energy to be lost into the surrounding dielectric material. The efficiency of the waveguide is thereby increased and the losses are decreased.

Other preferred features of the present invention are described in this paragraph. The core may be surrounded on all but one side by the refractive layer. The refractive layer may be U-shaped to surround the core except on the one side. A cap of refractive material having essentially the same index of refraction as the U-shaped refractive layer extends across the one side of the core between ends of the U-shaped refractive layer. A second refractive layer of optically transmissive material in addition to the first refractive layer may be formed in the trench between the core and the first refractive layer. The second refractive layer has an index of refraction which is less than the index of refraction of the core and greater than the index of refraction of the first refractive layer. Caps of the refractive material extend across the one side of the core between ends of one of the first or second U-shaped refractive layers to form encircling refractive layers surrounding the core. The first and second refractive layers are preferably formed by deposition in a self aligned manner within the trench.

The fabrication method preferably employs a damascene technique of forming the trench into the dielectric material from an upper exposed surface of the dielectric material and thereafter progressing in the self-aligning and filling process steps as described. Consequently, the graded index of refraction waveguide may be formed in an IC-like structure using the typical, well-known and reliable fabrication techniques employed in other types of IC fabrication, particularly when the IC-like structure includes both electrical and optical components.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and by reference to the appended claims.

DETAILED DESCRIPTION

Figure 1:
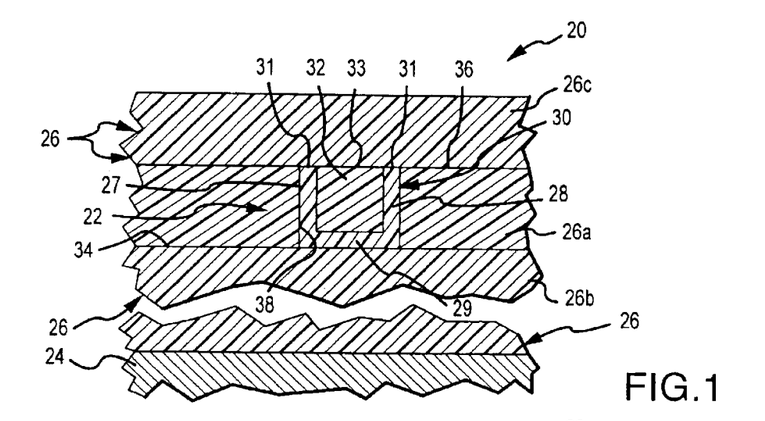
FIG. 1 is a partial, vertical cross-sectional view of an integrated circuit-like structure having an on-chip graded index of refraction optical waveguide which incorporates the present invention.

A portion of an integrated circuit (IC)-like structure 20 incorporating a graded index of refraction optical waveguide 22 is shown in FIG. 1. The IC-like structure 20 may have functional electronic components (not shown) located in a substrate 24. These functional components may be electrically connected to each other by interconnect conductors (not shown) located in layers above the substrate 24 or by waveguides (such as that shown at 22) which are also located in layers above the substrate 24. Insulation-type dielectric material 26, formed in layers 26a, 26b, 26c, etc., separates the electrical components of the substrate 24 from interconnect conductors and waveguides. In other types of IC-like structures, waveguides alone may be used to form interconnects between electrical components. In still other types of IC-like structures, only waveguides may be as the interconnects, and the functional components connected to those waveguide interconnects will be located externally of the IC-like structure.

The waveguide 22 is made of an optically transmissive material. The interlayer dielectric material 26 forms a cladding material for the waveguide 22. The dielectric material 26 may or may not be light transmissive material. Preferably however, the interlayer dielectric material 26 has a relatively low index of refraction compared to a relatively higher index of refraction of all of the light transmissive components of each waveguide located within the dielectric material 26.

The waveguide 22 includes a U-shaped refractive layer 30. The U-shaped refractive layer 30 is formed by leg portions 27 and 28 that extend substantially vertically (as shown) and a bottom portion 29 that extends substantially horizontally (as shown) between the bottom ends up the leg portions 27 and 28. The leg and bottom portions 27, 28 and 29 have a substantially equal or uniform thickness.

The waveguide 22 also comprises a center or core material 32 which is positioned within, and conforms to, the interior of the U-shaped refractive layer 30. The core material 32 has a higher index of refraction than the refractive layer 30. As shown in FIG. 1, the core material 32 is substantially rectangular and preferably square. An upper surface 33 of the core material 32 is preferably flush with upper edges 31 of the U-shaped refractive layer 30.

The dielectric material 26 in the layer 26c located above the waveguide 22 is similar to the dielectric material 26 in the layer 26b located below the waveguide 22 and is similar to the layer 26a of dielectric material 26 located on the sides of the waveguide 22. The material 26c above the waveguide 22 may separate the waveguide 22 from other upper layers of interconnect waveguides (not shown), which are described in the concurrently filed application for "On-Chip Multiple Layer Transitioning Optical Waveguide and Damascene Method of Fabricating the Same," noted above.

The waveguide 22 propagates an optical signal in a direction orthogonal to the view shown in FIG. 1. As the light signal propagates through core material 32, portions of the signal may diverge and impinge on the refractive layer 30. Since the index of refraction of the refractive layer 30 is less than the index of refraction of the core material 32, a substantial amount of the energy of the diverging light signal is reflected back into the core material 32. The light energy which enters the refractive layer 30 may further be diverted toward the dielectric material 26 until it eventually impinges on the dielectric material 26. Since the index of refraction of the dielectric material 26 is less than the index of refraction of the refractive layer 30, most of the light energy in the refractive layer 30 signal is reflected away from the dielectric material 26, back into the refractive material 30. Any light energy deflected toward the interface between the refractive material 30 and the core material 32 will encounter the relatively greater index of refraction of the core material 32 compared to that of the refractive material 30, which will cause a majority of the light to move into the core material 32.

Because of the "graded" indices of refraction obtained by the relatively higher index of refraction of core material 32, the relatively intermediate index of refraction of the refractive material 30 and the relatively lower index of refraction of the dielectric material 26, only a small portion of the light energy enters the dielectric material 26 and is lost. The graded index of refraction characteristics of the waveguide 22 confines the majority of the optical energy in the waveguide 22, which reduces losses in optical signal energy, and enhances the quality of the optical signal. The optical losses can be reduced to almost zero by the time any portion of the optical signal reaches the dielectric material 26.

The waveguide 22 is particularly useful in conducting so-called single mode optical signals. Single mode optical signals are polarized and generally have their radiation energy oscillating in a single plane. In the case of the optical waveguide 22, the single mode oscillation of the light energy is in a horizontal plane. The horizontally oscillating energy encounters the vertical legs 27 and 28 of the U-shaped refractive layer 30 which establish the graded refractive function and confine the substantial majority of the horizontally oscillating light energy in the core material 32. Thus, the single mode oscillations in the horizontal plane will not normally be rotated or disturbed so as to avoid interaction with the U-shaped graded refractive layer 30.

Should the light energy be disturbed from the polarized horizontal oscillating plane, a graded refractive effect will result when the light energy encounters the bottom portion 29 of the refractive layer 30 in the same manner that the leg portions 27 and 28 create a refractive effect. However, when any light energy encounters the surface 33 of the core material 32 which interfaces with the dielectric material 26c, a refractive effect will still occur because of the relatively higher index of refraction of the core material 32 compared to that of the dielectric material 26c. Thus, a reflective effect is obtained at the upper surface 33 of the core material 32, but the degree of energy lost into the dielectric material 26c is greater because of the angle at which the diverging optical energy encounters the interface at the surface 33. Accordingly, the waveguide 22 does not provide an entire graded index of refraction capability surrounding the core material 32 on all sides. In many applications, the location of the refractive layer 30 on three sides of the core material 32 is adequate.

The waveguide 22 can be formed using conventional damascene semiconductor fabrication techniques, using the same materials and process steps employed in creating electrical IC-like structures 20, even when that structure 20 includes electronic components in addition to the optical components. Details concerning the process steps for fabricating the optical waveguide 22 shown in FIG. 1 are described below in sequence in conjunction with FIGS. 2–6.

Figure 2:
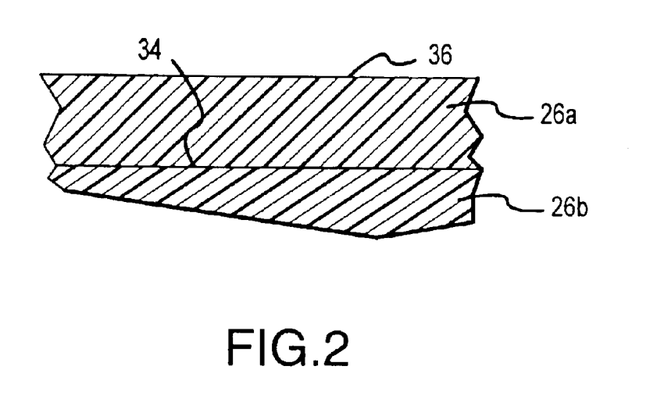
FIGS. 2–6 are cross-sectional views showing a sequence of steps involved in fabricating the optical waveguide shown in FIG. 1, according to the present invention.

The process steps of forming the waveguide 22 generally begin at the stage shown in FIG. 2 where an additional layer 26a of dielectric material has been formed on an upper surface 34 of the lower layer 26b of dielectric material using conventional deposition techniques. Preferably the dielectric material of the layer 26a is of the same type as the dielectric material of the layer 26b. However, the material of the layer 26b may be any type of material which is suitable for use as cladding material for a waveguide.

Generally, the upper surface 34 of the layer 26b has been previously polished, making the surface 34 relatively planar. The layer 26a of dielectric material is then deposited by conventional techniques such as chemical vapor deposition (CVD) or spin-on deposition. A relatively uniform depth of dielectric material in the layer 26a results, having a relatively smooth upper surface 36.

Figure 3:
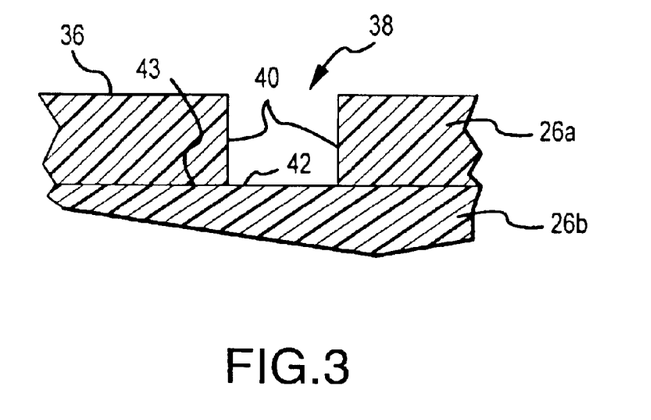

The next step involves forming a trench 38 into the layer 26a, as shown in FIG. 3. The trench 38 is preferably formed by etching, and the etching is preferably accomplished using conventional photoresist deposition, photolithographic patterning and reactive ion etch steps. Reactive ion etching creates the trench 38 with substantially vertical side walls 40 and a substantially horizontal bottom surface 42. The trench 38 extends down to the upper surface 34 of the lower layer 26b of the dielectric material 26. Any of several known techniques can be used to control the depth of the trench 38. For example, one technique involves stopping the reactive ion etch process at a predetermined time related to the depth to which the etching has progressed. Another technique involves forming a conventional etch stop layer on the upper surface 34 of the layer 26b (FIG. 2) prior to the deposition of the material 26a. An etch stop layer is a thin layer or change in characteristics or chemical composition which causes the reactive ion etching to stop when it reaches the etch stop layer, as is known.

The depth and width of the trench 38 is selected to accommodate the characteristics of the horizontally polarized optical waves guided by the waveguide 22 (FIG. 1). Depending on the frequency characteristics of the optical signals conducted, the depth and width should be deep and wide enough to accommodate an integer number of wavelengths, as is known in the field of optical signal transmission.

Figure 4:
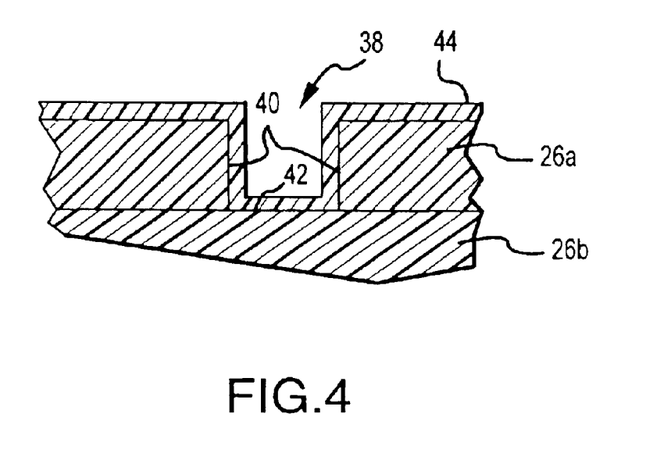

Next, a layer 44 of optically transmissive refractive material is deposited on the side walls 40 and the bottom surface 42 of the trench 38, and on the adjacent upper surface 36 of the layer 26b of dielectric material 26a as shown in FIG. 4. The refractive layer 44 is preferably deposited using chemical vapor deposition. The refractive layer 44 is of a relatively uniform thickness.

Figure 5:
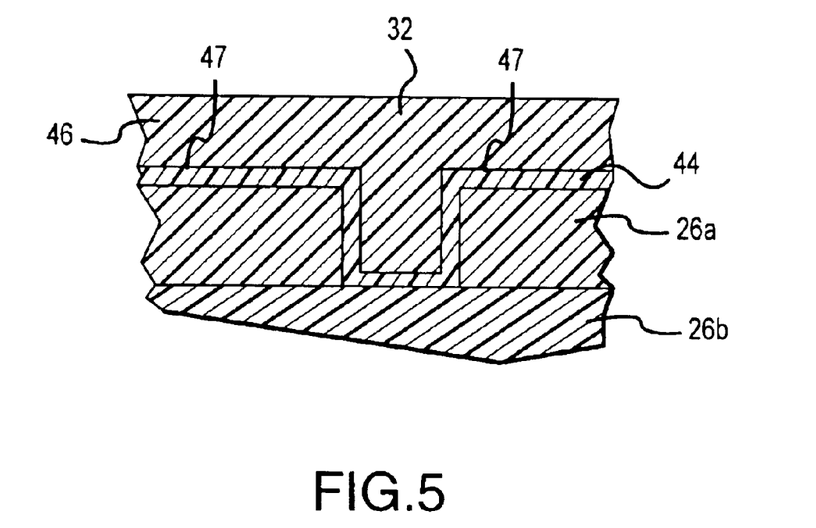

The next step involves depositing a coating 46 of the core material 32, as shown in FIG. 5. The coating 46 fills the opening remaining in the trench 38 after the refractive layer 44 has been deposited and also preferably covers upper surfaces 47 of the refractive layer 44 as shown in a FIG. 5. The core material 32 must completely fill the open interior of the refractive layer 44 within the trench 38.

Figure 6:
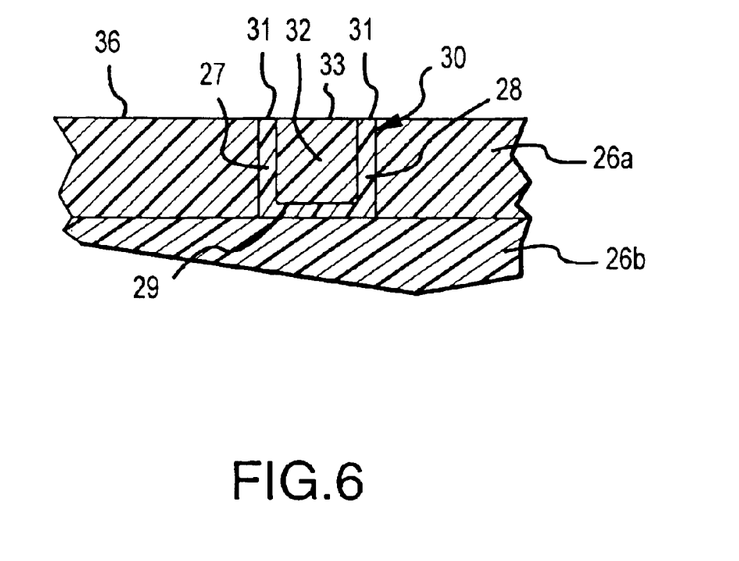

Once the core material 32 has been deposited in the coating 46, the upper surface of the coating 46 and the upper surface of the refractive layer 44 are removed using chemical-mechanical polishing (CMP), as shown in FIG. 6. The CMP step removes substantially all of the layer 44 of the refractive material 32 and the coating 46 of the core material 32 outside of the trench 38 and above the upper surface 36 of the dielectric material layer 26a, leaving only the U-shaped refractive layer 30 and the core material 32 within the trench 38. The CMP step also causes the upper surface 33 of the core material 32, the upper edges 31 of the legs 27 and 28 of the U-shaped refractive layer 30, and the upper surface 36 of the layer 26a of the dielectric material 26 to become substantially planar.

Because the dielectric material 26a, the refractive layer 30 and the core material 32 will typically have different degrees of hardness, they will polish at different rates. The harder materials will tend to resist polishing, while the adjacent softer materials will tend to polish more quickly at locations spaced from the harder materials. As a consequence, there is a tendency for a slight "dishing" effect to be created, where the surface of the softer material between areas of harder materials is slightly concave or dished, compared to a planar surface.

The structure of the waveguides of the present invention reduces the tendency for dishing. The upper edges 31 of the leg portions 27 and 28 of the U-shaped refractive layer 30 tend to resist dishing to a greater extent than if the refractive layer 30 was not employed. The upper edges 31 tend to resist the erosion effect created by the CMP, thereby minimizing the dishing of the core material 32 between the leg portions 27 and 28. The use of the U-shaped refractive layer 30 minimizes the amount of the core material 32 which is subject to dishing. The U-shaped refractive layer 30 narrows the overall width of the core material 32, and a narrower width of a lesser amount of core material 32 reduces the probability and extent of dishing. The known characteristics and CMP polish rates of the materials used allows the process to be practiced to minimize detrimental effects of dishing.

Following the CMP process step shown in FIG. 6, the process of forming the waveguide 22 is completed by depositing the upper layer 26c of dielectric material 26 on the upper surface 36 of the dielectric material layer 26a, as shown in FIG. 1. The layer 26c covers the upper edges 31 of the U-shaped refractive layer 30 and the upper surface 33 of the core material 32, as shown in FIG. 1. The deposition of the upper dielectric material layer 26c is accomplished by steps similar to the deposition of the material 26a as shown in FIG. 2. Preferably, the deposition of the upper dielectric material layer 26c is accomplished by either conventional CVD or spin-on processes.

The fabrication of the waveguide 22 using the steps described in FIGS. 2–6 does not involve any new or unusual process steps. The steps employed are well known in the field of conventional electrical IC fabrication. The process steps involve the use of damascene fabrication techniques, which are well-known and conveniently applied in conventional electrical IC fabrication processes. Many of the steps are self-aligning, as shown in FIGS. 4 and 5, which further contributes to the relative ease of practicing the fabrication technique. The steps are highly reproducible and have a known yield predictability rate, which contributes to reliability in manufacturing.

Figure 7:
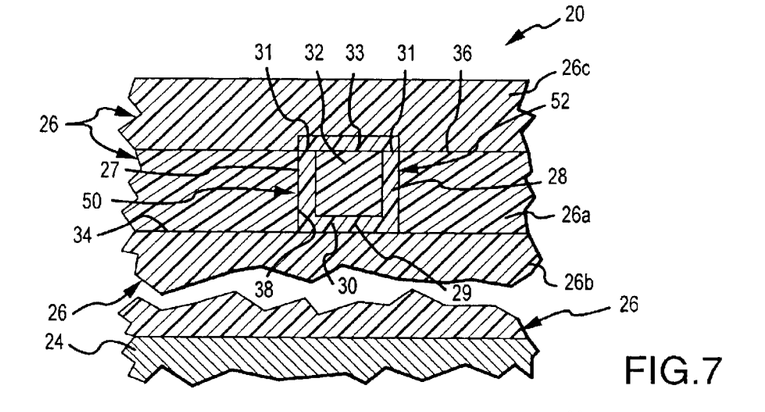
FIG. 7 is a partial, vertical cross-sectional view of an integrated circuit-like structure incorporating another embodiment of an on-chip graded index of refraction optical waveguide which incorporates the present invention.

Although the waveguide 22 shown in FIG. 1 is primarily useful in transmitting single mode optical signals, another waveguide 50 of the present invention, shown in FIG. 7, is useful primarily in conducting multi-mode optical signals. Multi-mode optical signals have oscillations of optical energy in mutually perpendicular planes or in any number of planes parallel to an axis extending along the waveguide 50.

The waveguide 50 shown in FIG. 7 is essentially similar to the waveguide 22 shown in FIG. 1 except for an encircling refractive layer 52. The encircling refractive layer 52 is formed by a cap portion 54 which is formed on the U-shaped refractive layer 30. The cap portion 54, in conjunction with the U-shaped refractive layer 30, creates the encircling refractive layer 52 which completely surrounds and encloses the core material 32. The cap portion 54 extends across the U-shaped layer 30, contacting both upper edges 31 of the leg portions 27 and 28 while extending across the upper surface 33 of the core material 32. The cap portion 54 is made of the same material used to form the U-shaped refractive layer 30; consequently the entire encircling refractive layer 52, formed by the cap portion 54 and the U-shaped portion 30, has the same index of refraction.

The cap portion 54 creates a graded index of refraction effect at the top surface 33 of the core material 32 in the same manner that the graded index of refraction is established by the U-shaped refractive layer 30 on the other three sides of the core material 32. As optical signals propagate through the core material 32, the light energy impinges on the cap portion 54, rather than being refracted into the upper layer 26c of dielectric material 26. Since the refractive material of the cap portion 54 has a lower index of refraction than the core material 32, most of the light energy is reflected at the cap portion 54 back into the core material 32. Any refracted light that enters into the cap portion 54 eventually impinges on the dielectric material of the layer 26c. However, because the index of refraction of the cap portion 54 is less than that of the dielectric material layer 26c, the optical energy of the signal is mostly reflected back into the cap portion 54 and then back into the core material 32, rather than into the dielectric material 26. Thus, by incorporating the cap portion 54 in the waveguide 50, multi-mode signals may be conducted within the waveguide with significantly less losses of energy into the material 26.

Figure 8:
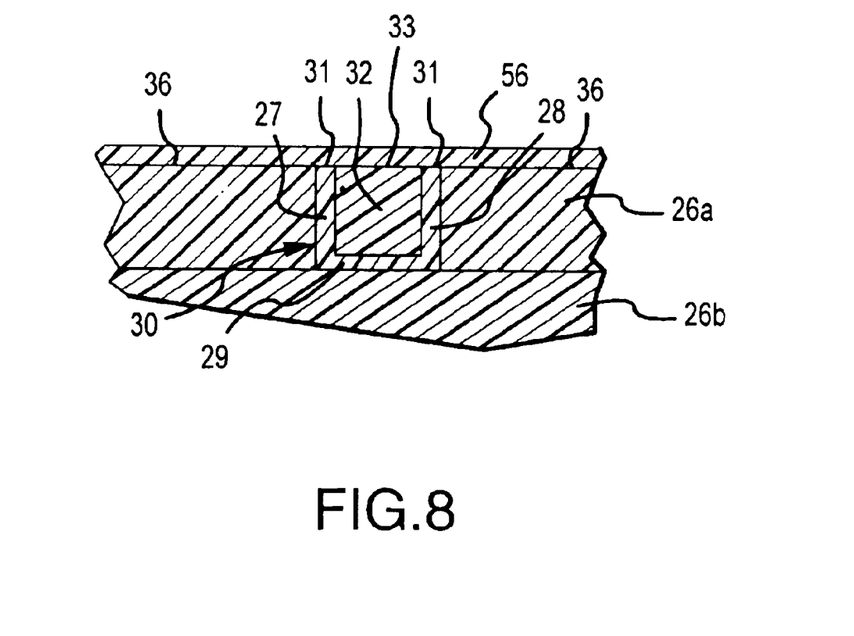
FIGS. 8–9 are cross-sectional views showing modified process steps involved in fabricating the waveguide shown in FIG. 7 according to the present invention.

The waveguide 50 is fabricated using a continuation of the same process steps used in fabricating waveguide 22 previously discussed above in connection with FIGS. 2–6. Once the CMP process step discussed with respect to FIG. 6 is complete, a layer 56 of refractive material is deposited on the upper surface 36 of the dielectric material layer 26a, on the upper edges 31 of the leg portions 27 and 28, and on the upper surface 33 of the core material 32, as shown in FIG. 8. The layer 56 is preferably of the same refractive material from which the U-shaped refractive layer 30 has previously been formed. The layer 56 is preferably deposited using CVD or spin-on deposition techniques. The width of the layer 56 is sufficient to span the horizontal width between the upper edges 31 of the leg portions 27 and 28 of the U-shaped refractive layer 30, and will generally cover the entire upper surface 36 as shown in FIG. 8.

Figure 9:
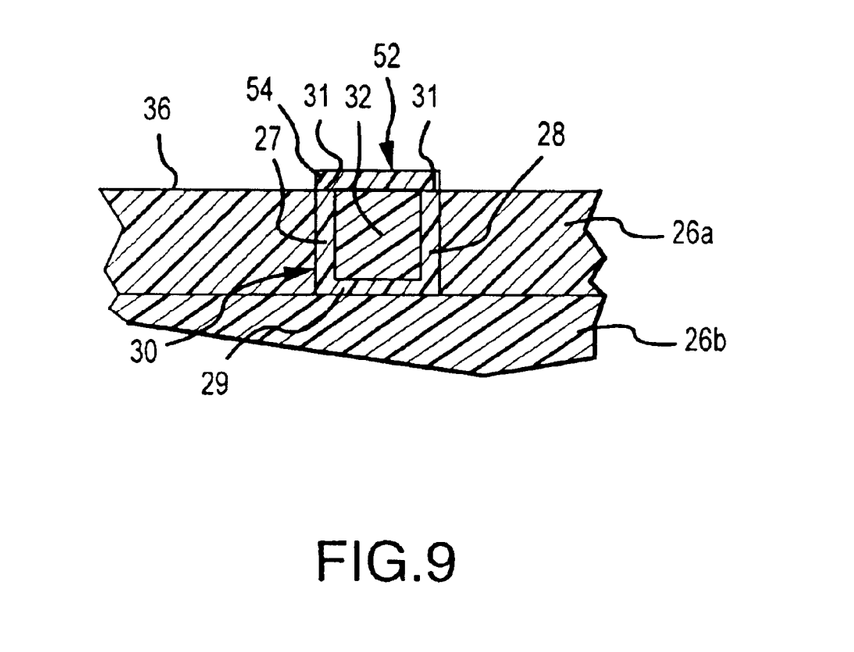

Next, using standard lithographic techniques, portions of the layer 56 which are positioned laterally to the exterior of the upper edges 31 of the leg portions 27 and 28 are patterned and etched away as shown in FIG. 9. The etching process leaves the cap portion 54 in contact with the upper edges 31. Thereafter, the upper dielectric material layer 26c is deposited and polished to complete the waveguide 50 (FIG. 7).

Figure 10:
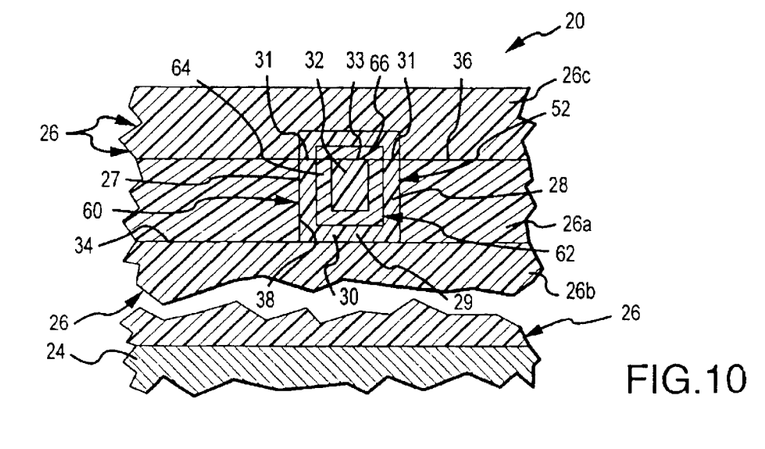
FIG. 10 is a partial, vertical cross-sectional view of an integrated circuit-like structure incorporating a third embodiment of an on-chip graded index of refraction optical waveguide which incorporates the present invention.

The same series of process steps described in FIGS. 2–6, 8 and 9 may be employed to create a multiple layer graded index of refraction waveguide 60, as shown in FIG. 10. The waveguide 60 includes the same components described in conjunction with the waveguide 50 shown in FIG. 7, but in addition includes a second interior encircling refractive layer 62 is located inside of the first outer encircling refractive layer 52. The interior encircling refractive layer 62 is formed by a U-shaped layer 64 to which a cap portion 66 is attached. The index of refraction of the interior encircling refractive layer 62 is greater than that of the outer encircling refractive layer 30, but less than the refractive index of the core material 32. Thus, four levels of gradation in refractive indices are available in the waveguide 60, with the relative magnitudes of the refractive indices increasing from the core material 32 to the inner encircling refractive layer 62, to the outer encircling refractive layer 52, and to the dielectric material 26 which forms the cladding for the waveguide 60.

The waveguide 60 is fabricated using a continuation of the same process steps used in fabricating waveguides 22 and 50, previously discussed above in connection with FIGS. 2–6, 7 and 8. The U-shaped portion 64 of the interior encircling refractive layer 62 is formed as a part of a layer (not shown) formed in essentially the same manner as the layer 44 shown in FIG. 4 is formed, before the core material 32 is deposited (FIG. 5). Thus, the second layer of refractive material (not shown) from which the U-shaped portion 64 is formed and the layer 44 are deposited in sequence and in a general parallel, self-aligning relationship with one another. Thereafter, the core material 32 is deposited within the interior of the second layer (not shown), in a manner similar to that shown in FIG. 5. A CMP step such as that illustrated in FIG. 6 is next performed. As a result of the CMP step, the two U-shaped portions 52 and 64 are formed, in a structure related to that shown in FIG. 6. Thereafter, a layer of material (not shown) from which the interior cap portion 66 is formed is deposited, in a manner similar to that illustrated in FIG. 8. Thereafter, this layer is patterned and etched in a manner similar to that illustrated in FIG. 9, thereby forming the interior top portion 66 for the interior refractive layer 60. From this point on, the process proceeds as described in conjunction with FIGS. 8 and 9, to form the exterior cap portion 54 of the U-shaped material 30, thus completing the waveguide 60.

The waveguide 60 offers a higher degree of optical transmission efficiency, i.e. less energy losses, compared to the waveguide 50. In the waveguide 60, the interior encircling refractive layer 60 has a higher index of refraction than the index of refraction of the exterior encircling refractive layer 30, but a lower index of refraction than the core material 32. With the indices of refraction arranged in the described manner, the graded indices of refraction better confine the light energy in the core material 32 and allow less light energy to escape into the surrounding dielectric material 26 forming the cladding, making the waveguide 60 more lossless.

Any convenient number of additional refractive layers may be constructed in a waveguide following the principles discussed above. All of the additional layers may be fabricated using conventional semiconductor IC fabrication steps in a conventional damascene process using process steps which are compatible with other process steps used to fabricate the IC-like structure. The resulting waveguides may be formed as needed and in multiple numbers to provide an enhanced layer of optical interconnects.

Alternatively, in a manner similar to the waveguide 22 shown in FIG. 1, one or more of the cap portions 54 and 66 of the waveguides 50 and 60 shown in FIGS. 7 and 9, respectively, may be omitted, when the waveguides are employed to transmit single mode optical signals, or if otherwise desired. Thus, for example, a waveguide may be formed by any convenient and practical number of U-shaped portions 30 and 62. Further still, a waveguide may be formed from one or more encircling refractive layers (e.g. 52 or 62) in combination with one or more U-shaped refractive layers (e.g. 30 or 64). Eliminating one or more of the cap portions 54 and 66 still achieves improved optical transmission efficiencies from multiple interior refractive layers having different indices of refraction, particularly when single-mode, horizontally-planarized optical signals are transmitted.

Preferred embodiments of the waveguides and methods of manufacturing them have been shown and described with a degree of particularity. The following claims define the scope of the invention, and that scope should not necessarily be limited to the preferred embodiments described above.

The invention claimed is:

1. An optical waveguide formed in an integrated circuit-like structure having a substrate, comprising:
   at least one layer of dielectric material positioned above the substrate and defining a trench having side walls, the dielectric material having an index of refraction;
   a first refractive layer of optically transmissive material adjoining the side walls within the trench and conforming to the side walls, the first refractive layer having an index of refraction;
   a second refractive layer of optically transmissive material adjoining and conforming to the first refractive layer within the trench, the second refractive layer having an index of refraction;
   a core of optically transmissive material adjoining and conforming to the second refractive layer within the trench, the core having an index of refraction; and wherein:
      the index of refraction of the first refractive layer is greater than the index of refraction of the dielectric material, the index of refraction of the second refractive layer is greater than the index of refraction of the first refractive layer, and the index of refraction of the core is greater than the index of refraction of the second refractive layer.

2. A waveguide as defined in claim 1 wherein:
   the first and second refractive layers surround the core except on one side; and
   the dielectric material contacts the core on the one side of the core where the first and second refractive layers do not surround the core.

3. A waveguide as defined in claim 2 wherein:
   the first and second refractive layers are each U-shaped;
   the second U-shaped refractive layer surrounds the core except on the one side of the core; and
   the first U-shaped refractive layer surrounds the second U-shaped refractive layer except on the one side of the core.

4. A waveguide as defined in claim 3 further comprising:
   a cap of the refractive material extending across the one side of the core between ends of one of the first or second U-shaped refractive layers, the cap extending between the core and the dielectric material, the cap having essentially the same index of refraction as the U-shaped refractive layer to which the cap is connected; and wherein:
      the cap and the one of the U-shaped refractive layers to which the cap is connected encircle the core.

5. A waveguide as defined in claim 3 further comprising:
   a first cap of refractive material extending across the one side of the core between ends of the first U-shaped refractive layer, the cap adjoining and conforming to the core and the refractive layer, the cap having essentially the same index of refraction as the first U-shaped refractive layer; and
   a second cap of refractive material extending across the one side of the core between ends of the second U-shaped refractive layer, the second cap having essentially the same index of refraction as the second U-shaped refractive layer;
   the first cap adjoins and conforms to the dielectric material and the second cap;
   the second cap adjoins and conforms to the core and the first cap;
   the first cap and the first U-shaped refractive layer encircles the second cap and the second U-shaped refractive layer; and
   the second cap and the second U-shaped refractive layer encircles the core.

6. A waveguide as defined in claim 1 wherein:
   the first refractive layer is formed by deposition in a self-aligned manner with the trench;
   the second refractive layer is formed by deposition in a self-aligned manner with the first refractive layer; and
   the core material is formed by deposition in a self aligned manner with the second refractive layer.

* * * * *